United States Patent [19]

White

[11] Patent Number: 4,933,829
[45] Date of Patent: Jun. 12, 1990

[54] FREE RUNNING FLYBACK DC POWER SUPPLY WITH CURRENT LIMIT CIRCUIT

[75] Inventor: Alan V. White, Hockley, Tex.

[73] Assignee: Compaq Computer Corporation, Houston, Tex.

[21] Appl. No.: 338,452

[22] Filed: Apr. 17, 1989

Related U.S. Application Data

[63] Continuation of Ser. No. 175,640, Mar. 24, 1988, abandoned, which is a continuation of Ser. No. 57,098, Jun. 2, 1987, abandoned.

[51] Int. Cl.[5] ............................................. H02M 3/24
[52] U.S. Cl. ........................................ 363/95; 363/21; 363/131; 363/56; 361/91; 361/111
[58] Field of Search ...................... 363/20, 21, 95, 97, 363/131, 55, 56, 57, 58; 361/91, 111, 18, 93

[56] References Cited

U.S. PATENT DOCUMENTS

| | | | |
|---|---|---|---|
| 4,104,714 | 8/1978 | Smith et al. | 363/21 |
| 4,224,659 | 9/1980 | Iguchi | 363/20 |
| 4,272,806 | 6/1981 | Metzger | 363/21 |
| 4,323,961 | 4/1982 | Josephson | 363/56 |
| 4,425,611 | 1/1984 | Easter | 363/21 |
| 4,494,178 | 1/1985 | Ishima | 363/21 |
| 4,668,905 | 5/1987 | Schierjott | 363/56 X |
| 4,769,752 | 9/1988 | Rackowe | 363/56 |

*Primary Examiner*—Peter S. Wong
*Assistant Examiner*—Emanuel T. Voeltz
*Attorney, Agent, or Firm*—Arnold, White & Durkee

[57] ABSTRACT

The present invention relates to a DC power supply of the free-running flyback type and a current limit circuit incorporated therein. The current limit is changed as a function of AC line voltage thereby reducing the worst case peak power dissipation in the power switching transistor. In one embodiment, one or more turns on the transformer provides a sensing voltage proportional to supply voltage to vary the switching transistor current limit as a function of supply voltage.

8 Claims, 4 Drawing Sheets

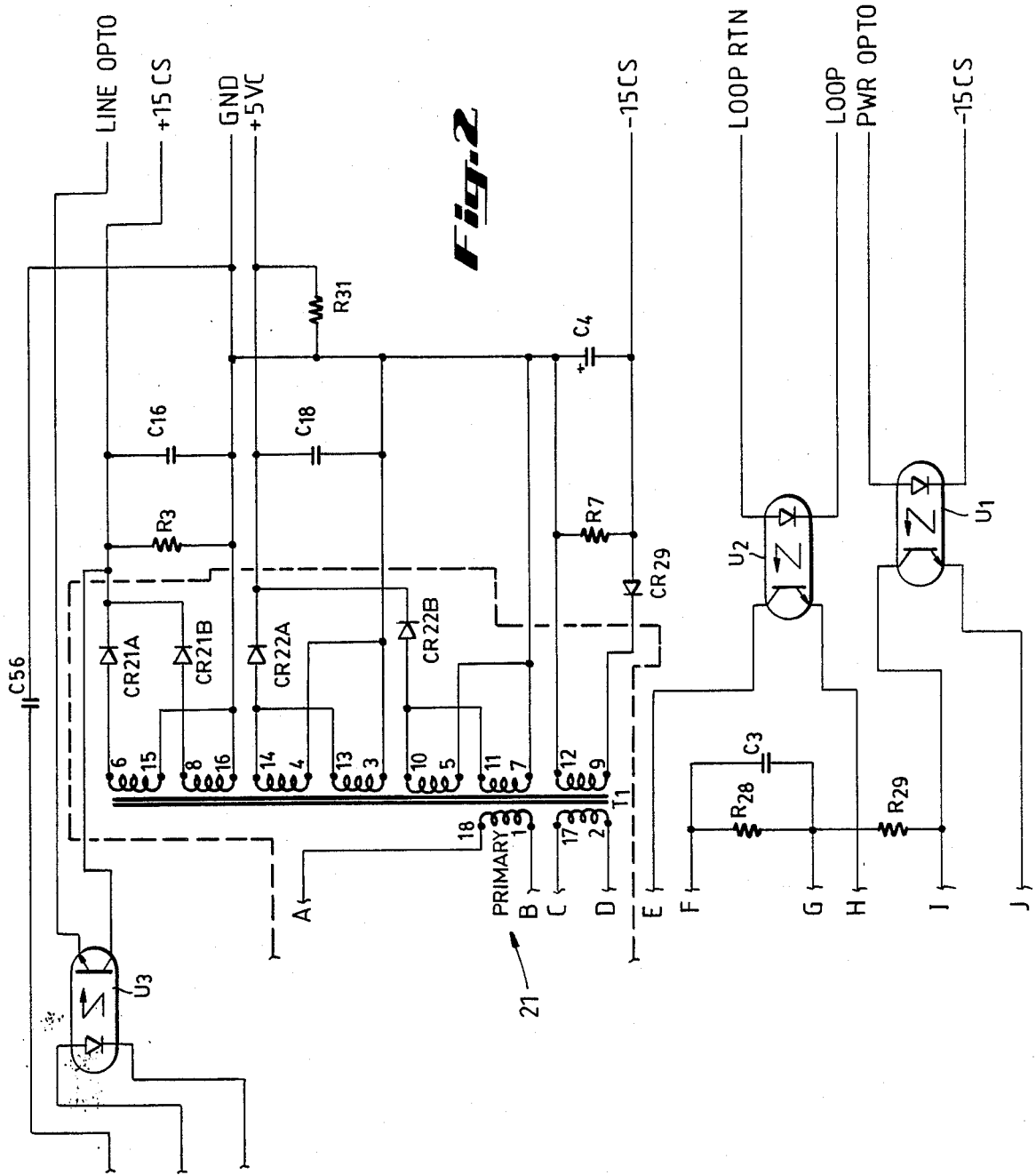

IDEAL WATTS INPUT VS SUPPLY VOLTS
FREE RUNNING DISCONTINUOUS FLY BACK

TURN OFF VOLTAGE VS CURRENT

FREE RUNNING FLYBACK DC POWER SUPPLY WITH CURRENT LIMIT CIRCUIT

This is a continuation of application Ser. No. 175,640, filed Mar. 24, 1988, now abandoned, which is a continuation of application Ser. No. 057,098, filed June 2, 1987, now abandoned.

BACKGROUND OF THE INVENTION

I. Field of the Invention

This invention relates to a power supply for driving an electronic load.

II. Description of the Prior Art

Off-line switching mode power supplies are commonly used in computers to achieve small size and high efficiency. The 115/230 Volts (AC) input power is rectified and passed through a regulating DC-DC converter to produce the various voltages needed for logic networks, disk drives, etc. A type of regulating converter in common use is the flyback or ringing choke type that stores energy in a multi-winding choke (power transformer) during the first half cycle and delivers this energy to the output load during the second half cycle. The storage and discharge portion of the duty cycle are generally controlled by a power transistor which acts as a switch. A common form of this flyback topology is the discontinuous flyback topology, in which the choke magnetic field is allowed to collapse completely after the second half cycle before a new cycle starts, leaving no energy stored in the choke. Two forms of discontinuous flyback topology are constant frequency, in which the cycle is started at regular fixed intervals, and free running, in which the new cycle starts immediately after the previous half cycle ends.

The power transistor used to switch the stored energy in the choke has a large peak power dissipated in the during the time required for transistor turnoff. In this short time, the peak power is dissipated near the surface of the transistor silicon chip and, if high voltage is present, on a small part of the surface. This dissipation of energy results in high peak temperatures and can produce a runaway condition in the silicon called second breakdown which usually destroys the transistor. This second breakdown limitation has resulted in special designs for high voltage switching power transistors and in snubber circuits to limit the rate of rise of voltage across the switching transistor during turnoff. High voltage across a transistor concentrates the current flow and causes a higher spot temperature. The snubber circuit allows the transistor to reach lower current before high voltage appears across the transistor.

RELATED APPLICATIONS

This application incorporates by reference copending application Ser. No. 057,535, filed concurrently herewith, entitled "DC Power Supply With Digitally Controlled Power Transistor Switch" by Alan E. Brown.

BRIEF SUMMARY OF THE INVENTION

It has been found to be advantageous to limit the current of the power transistor before turnoff to prevent destruction by the second breakdown conditions during turnoff. The present invention provides an improved current limit circuit for this purpose.

For power supplies with current limiting features the choke inductance is selected to set the power capacity of the power supply, at the operating frequency, at the minimum supply voltage. The current should be large enough to supply the desired power to the load, i.e., computer, yet small enough to avoid the second breakdown conditions. In constant frequency flyback topology, the current required at turnoff does not change with a change in supply voltage. The effect of a higher supply voltage is simply a shorter time for current to ramp up. In a free running flyback topology, this shorter current ramp up time results in a frequency increase, reducing the peak current required to produce the required power. Thus the frequency increase inherent in a free running flyback topology results in lower required peak currents, a feature which is considered advantageous. This characteristic further makes it possible to reduce the worst case stresses on the power transistor by reducing the current limit threshold for higher supply voltages.

The present invention changes current limit as a function of supply voltage by summing the voltage representing the sensed collector current of the power transistor with a voltage representing the supply voltage. The current limit circuit of the present invention gives a relatively flat maximum power curve over the normal range of supply voltage range and reduced power at supply voltages above this normal range. Line transients which may drive the supply voltage above the normal maximum may cause a reduced power output, however, the result of the reduced power output is a power supply shutdown.

A beneficial aspect of the present invention is that the stresses normally imposed on power transistors during normal operation are reduced by controlling the current limit threshold as a function of the supply voltage. An additional beneficial aspect of the present invention is that the control of the current limit threshold further limits the stresses on power transistors during line transient conditions, and results in reduced power output thus causing power supply shutdown. Although the power supply shutdown, during abnormal supply voltage conditions, may cause some inconvenience, this is viewed as minimal since the alternative would be a greater risk of power supply failure.

It is another object of the present invention to provide a more reliable power supply by reducing stresses on the power transistor by using some of the inherent characteristics of a free-running flyback topology and controlling the maximum power supply output at higher supply voltages. Control of the maximum power supply output thus results in lower transistor stresses.

It is a further object of the present invention to provide a power supply with a relatively constant output capacity over the normal range of supply voltages which reduces the output capacity at supply voltages above the normal range.

It is another object of the present invention to limit the current through the power transistor before turnoff to prevent transistor damage from second breakdown conditions during power transistor turnoff.

It is a further object of the present invention to provide increased power supply ruggedness for voltage supply transients without the cost of a larger power transistor.

These and other objects of the present invention are more particularly set forth in the accompanying detailed description.

BRIEF DESCRIPTION OF THE DRAWINGS

FIG. 2 is a partial schematic diagram of the secondary portion of both embodiments of the present invention which are electrically connected within a power supply;

DESCRIPTION OF THE PREFERRED EMBODIMENT

Figure 1A:
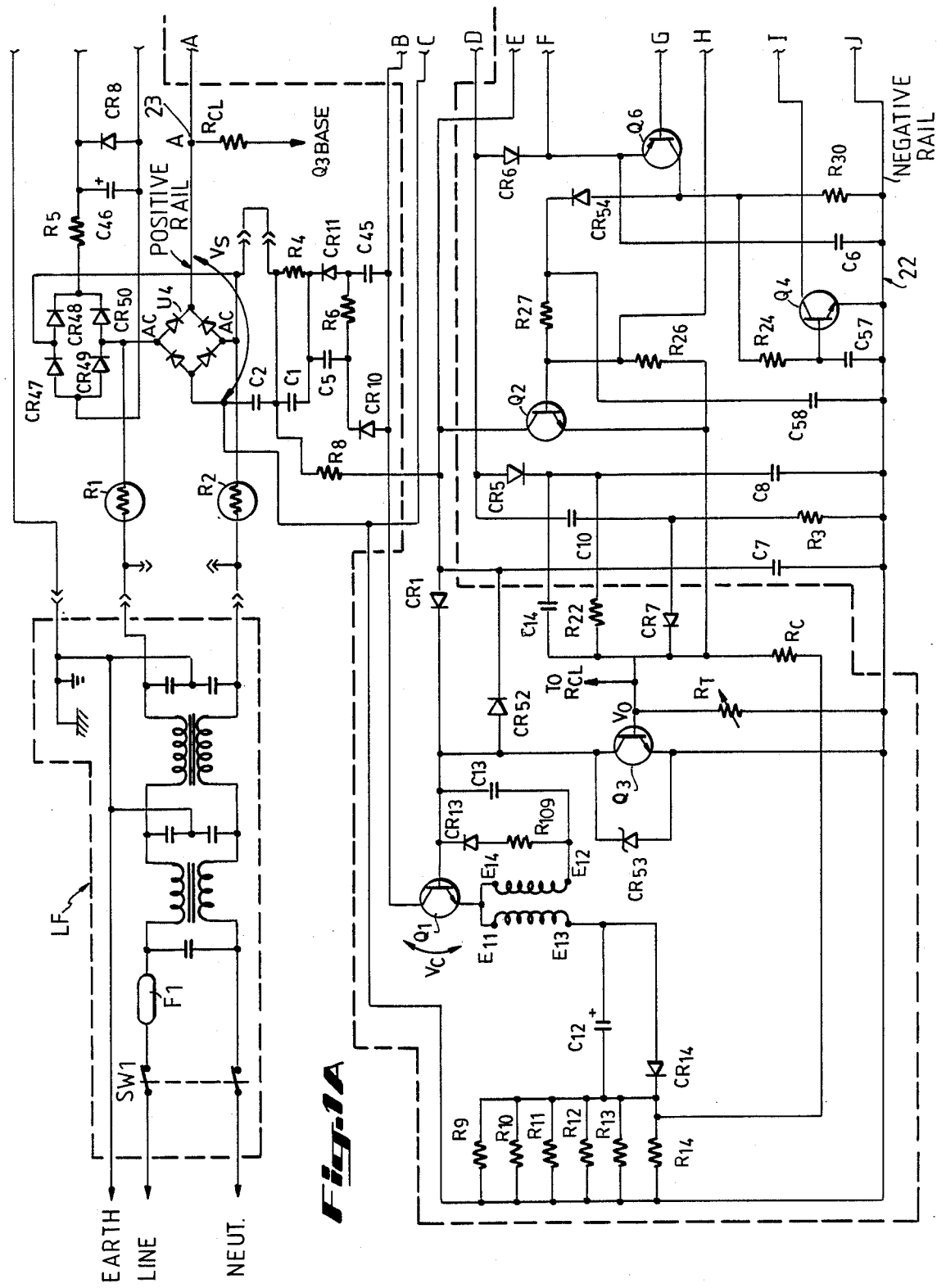
FIG. 1A is a schematic diagram of the primary portion of a first embodiment of this invention.

Referring now to FIGS. 1A and 2, the present invention will be described in greater detail with reference to the schematic diagrams of a first embodiment. An unregulated DC supply voltage is provided in the conventional manner by full-wave bridge rectifier (diode bridge) U4. Filtered AC voltage may be provided to the AC side of the diode bridge U4 through power on-off switch SW1, fuse F1 and one or more stages of LC line filter LF. Diode bridge U4 provides unregulated DC voltage to the primary windings of power transformer T1 (see FIG. 2). Electrically coupled in series with the primary winding 21 of transformer T1 is switching transistor Q1. When Q1 is on, current flows in the primary winding 21, creating a magnetic field, thus storing energy in transformer T1. When Q1 is switched off, the magnetic field collapses thus the energy initially stored in transformer T1 is transferred to the secondary winding of transformer T1, i.e., flyback is initiated. The switching action of Q1 is determined by an appropriate control signal at the base of Q1 from control transistor Q3. When transistor Q3 conducts, the base of Q1 is effectively connected to negative rail 22 thus turning off Q1. This initiates the transfer of energy stored in transformer T1 to its secondary winding.

In prior art devices the resistor $R_C$ provides a voltage at the base of Q3 which is proportional to the current flowing through transistor Q1. $R_C$ is tied between the base Q3 and the negative rail 22 through the parallel combination of resistors $R_9$, $R_{10}$, $R_{11}$, $R_{12}$, $R_{13}$, and $R_{14}$.

In a first embodiment of the present invention, resistor $R_{CL}$ is electrically connected between positive rail voltage at supply terminal 23 and the base of Q3. Resistor $R_{CL}$ is preferably about 100K Ohms with a 5-watt power rating. Also coupled to the based of Q3 is resistor $R_C$ as described above for prior art devices.

Thus, the currents through $R_{CL}$ and $R_C$ are summed at the base of Q3. Note that $R_{CL}$ and $R_C$ are connected in series through parallel combination of $R_9$ through $R_{14}$ across the unregulated voltage of diode bridge U4 as indicated by $V_s$. When the base-emitter junction of Q3 is forward biased sufficiently, Q3 turns "on" thus initiating flyback. Without resistor $R_{CL}$ the base voltage of Q3 is directly proportional to the current through Q1 (i.e., as in prior art devices); however, with resistor $R_{CL}$ in the present invention, $R_{CL}$ is connected to the positive rail and serves to provide a voltage to the base of Q3 which is proportional to the positive rail voltage.

In the preferred embodiment the current through $R_{CL}$ and current through $R_C$ are summed at the base of Q3.

By connecting $R_{CL}$ in the manner illustrated in FIG. 1A, the voltage applied to the base of Q3 is a function of the supply voltage (due to $R_{CL}$) and the current through Q1 (due to $R_C$). Thus the turn "on" of Q3 can be affected by both variations in supply voltage (i.e., line transients) and the Q1 current (i.e., short circuit conditions).

Under normal operating conditions current through $R_C$ ramps up to provide the turn-on voltage for Q3 over a period of time in a fashion well known in the art. With the presence of $R_{CL}$ in the preferred embodiment, a higher supply voltage causes Q3 to turn on prematurely (i.e., at a lower value of Q1 current). With higher supply voltages present transistor Q3 turns-on quicker since resistor $R_{CL}$ provides a portion of the Q3 turn-on voltage. Thus a ramp-up function is provided through resistor $R_c$ but Q3 "turn-on" is offset by a value which is proportional to the increased supply voltage. With the offset provided by $R_{CL}$, Q3 is turned on sooner for higher supply voltages. Trimming resistor $R_T$ permits adjustment, during final assembly of the power supply, to accommodate variations in Q3 characteristics (such as $h_{Fe}$ and $V_{BE}$).

Power supply output voltages are generated in the conventional manner by diodes CR21A, CR21B, CR22A, CR22B and CR29 and their associated filter circuits as shown in FIG. 2. Capacitor C56 provides capacitive coupling between input and output ground.

In general, the current through power switching transistor Q1 is allowed to reach a preset maximum prior to turnoff. This current maximum is set to prevent transistor damage and further reduced for lower transformer power input to accomplish output voltage regulation. The turnoff of Q1 is normally accomplished by turn on of Q3. At Q1 turnoff, the inductance of the primary winding 21 prevents a quick reduction of current, thereby causing a rapid rise in voltage across Q1. Without appropriate snubber and clamp circuits the result would normally be operation of transistor Q1 at a combination of voltage and current outside the safe operating area (SOAR) with resulting transistor damage. With snubber and clamp circuits, the voltage rises at a volts/microsecond rate equal to snubber capacitor amps/microfarad. The snubber and clamp circuits allow safe operation as long as the current at Q1 turnoff is not excessive.

Figure 1B:
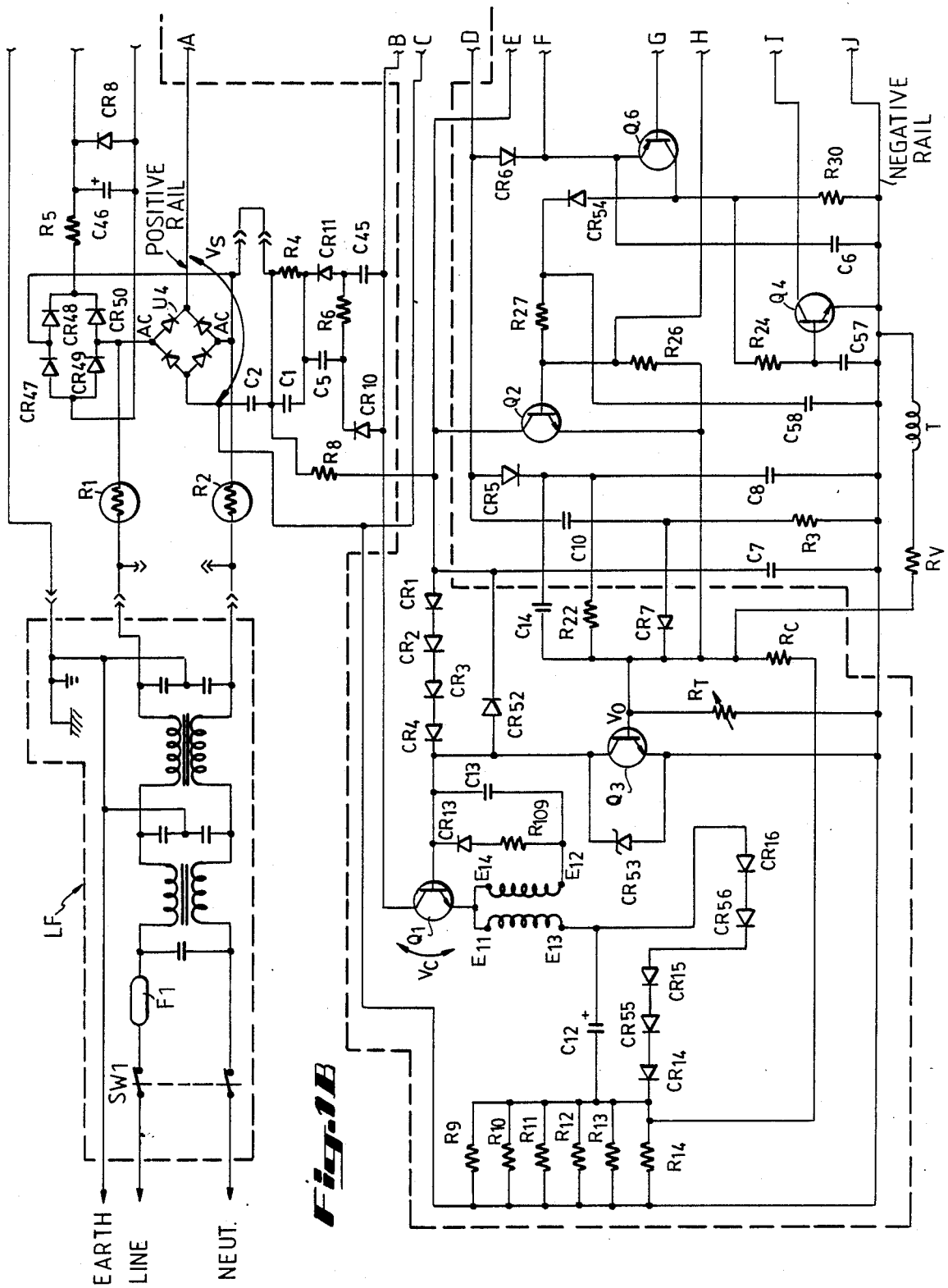
FIG. 1B is a schematic diagram of the primary portion of a second embodiment of this invention.

Referring now to FIGS. 1A and 1B the function of the snubber circuit and clamping circuit components will be described in more detail. Capacitors C1 and C2 function in the flyback topology illustrated in a manner well known in the art.

Again referring to FIGS. 1A and 1B, capacitor C45 and diode CR11 cooperatively operate with capacitors C5 and diode CR10 to provide a snubber circuit (also referred to as slew rate limit circuit which limits rate of rise of the collector voltage Q1), and collector voltage clamp, respectively, during Q1 turnoff (i.e., flyback cycle).

Due to the high inductance of the primary winding 21 of transformer T1 at Q1 turnoff conditions, the current continues to flow thereby rapidly increasing V of Q1. As the voltage rises, current flows into C45 to limit the rate of rise of voltage. Although the current into C45 limits the rate of voltage rise (slew rate), the voltage would reach an excessive value if not clamped by CR10. CR10 is normally back biased by the supply voltage positive rail and the additional 80 volts stored in C5. Whenever the Q1 collector voltage rises 80 volts higher than the supply voltage, at Q1 cutoff conditions, CR10 becomes forward biased and conducts to carry the excess transformer primary winding current into C5.

Once the collector voltage is successfully clamped and Q1 is once again turned on, C45 discharges and C5 discharges to its steady-state value (i.e., $V_S + 80$ V) through bleeder resistor $R_6$ since both CR10 and CR11 are turned off when Q1 is forward biased.

Figure 3:
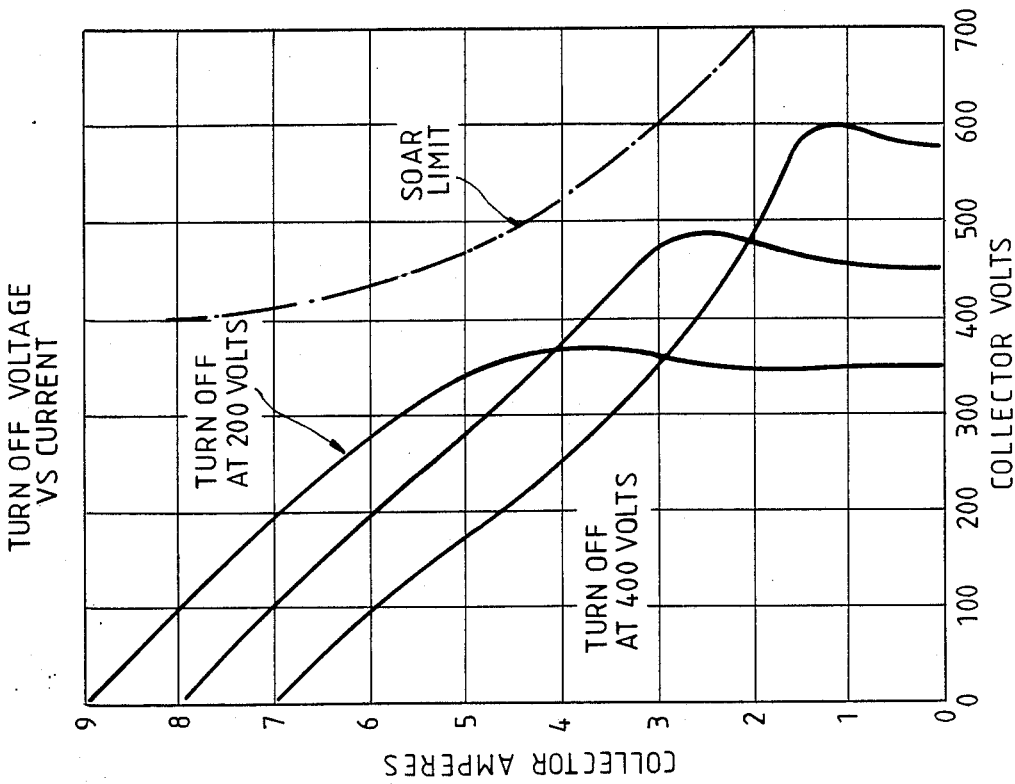
FIG. 3 is a plot which illustrates safe operating area margins for various collector currents as a function of supply voltage and the switching transistor SOAR limit.

The snubber circuit and the clamp circuit of the prior art in combination with lower collector currents produced by the supply voltage feed-forward circuit of the present invention produces the curves illustrated in FIG. 3.

The slope of the curves is established by the slew rate limiter with the turnoff (indicated in the curves) provided by the clamp circuit. The ordinate of the graph (collector amps) is controlled by the present invention limiting collector current through varying supply voltages by providing a feed-forward voltage, which is a function of $V_S$ to the base of Q3.

Implementation of the present invention permits a selection of collector "amps" with relative precision. Thus a designer can predict the stresses which will be imposed on Q1 by selection of the "collector amps."

FIG. 1B illustrates a second embodiment of the present invention. Reference numerals illustrated in FIG. 1B are the same for similar components shown in FIG. 1A. The description for FIG. 1A for similar components is incorporated herein by reference. In lieu of the resistor $R_{CL}$ as a means of sensing supply voltage to apply a proportional voltage to the base of Q3, a one-turn sensing winding T and resistor $R_v$ is used. The one-turn sensing winding T may be a single turn through the center of the donut shaped flyback transformer core or a single turn wound on to the primary of transformer T1 such that a voltage is developed in turn T which is proportional to supply voltage $V_S$. This proportional voltage flows in resistor $R_v$ which, as before, develops a proportional voltage which is applied to the base of Q3 and which is summed with the voltage developed by the current flowing through transistor Q1 through resistors $R_9$ through $R_{14}$ and resistor $R_C$. At high supply voltages, a higher voltage is induced in the one turn sensing winding which in turn develops a higher voltage at the base of Q3 turning Q3 on sooner during current ramp up. This results in a lower current limit on Q1 since it is turned off sooner on ramp up of Q3.

A table of the values for the electrical components used in the schematics shown in FIGS. 1A, 1B, and 2 is set forth in Appendix A which is incorporated herein by reference as if set forth in full.

Figure 4:
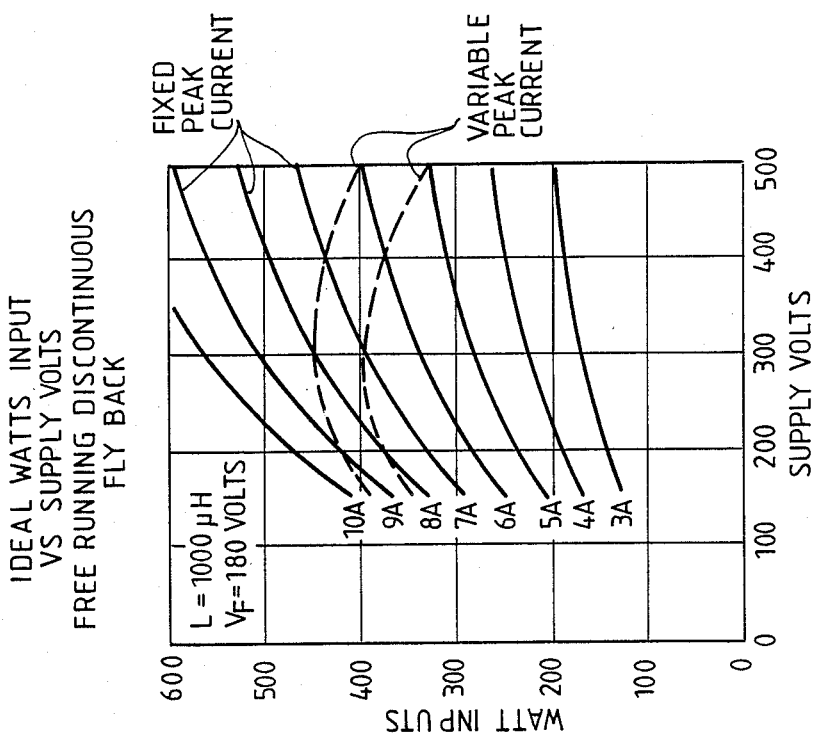
FIG. 4 is a plot illustrating power supply output as a function of supply voltage, with the effect of the present invention on the power supply output illustrated in dashed lines.

FIG. 4 is a plot which demonstrates the effect of implementing the present invention. Note that, for a 100 volt rise in DC supply voltage, there is roughly a one-amp reduction in peak current (from fixed peak current) in the normal operating range of approximately seven to nine amps. The results set forth in FIG. 4 demonstrate one of the novel aspects of the present invention in that power capacity remains relatively constant for supply voltage increases. This is in contradiction with prior art devices which have a power increase for supply voltage increases. Thus by effectively reducing power for supply voltages increases the stresses imposed on Q1 can be controlled. These novel aspects of the present invention result in a more reliable power supply through the range of supply voltages and provide an added degree of reliability during transient overvoltage conditions.

Referring again to FIG. 4, the effect on power capacity of increasing supply voltage is reflected in solid lines, i.e., power output increases as a function of supply voltage without the supply voltage feed-forward circuit consisting of resistor $R_{CL}$ (shown in FIG. 1A) or supply voltage feed-forward circuit consisting of one-turn sensing winding T and resistor $R_V$ (shown in FIG. 1B). The flyback transformer primary power flowing through Q1 increases as a function of supply voltage and causes increased stresses on Q1 at elevated voltages.

Implementation of the supply voltage feed-forward circuit shown in FIG 1A and 1B effectively reduces the flyback transformer primary current at elevated supply voltages. The effect of this invention is show in dashed lines. As supply voltage increases a decrease in current results in nearly constant power input and consequently output (efficiency remaining approximately equivalent) and reduced Q1 stresses.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

| Table of Circuit Component Values (in Ohms, microfarads) | |
|---|---|
| R1, R2 | 2.5 |
| R3 | 360, 2W |
| R4 | 22K, 2W |
| R5 | 47K, 2W |
| R6 | 2K, 22W |
| R7 | 360, 2W |
| R8 | 22K, 2W |
| R9–R14 | 2.2, 1/2W |
| R22 | 20, 2W |
| R23 | 120 |
| R24 | 100K |
| R26 | 100K |
| R27 | 10K |
| R28 | 100K |
| R29 | 68K |
| R30 | 100K |
| R31 | 39, 2W |
| R109 | 1, 2W |
| $R_V$ | 91 |
| $R_C$ | 22 |
| $R_T$ | 150 |
| $R_{CL}$ | 100K, 5W |
| C1, C2 | 470, 250V |
| C3 | .22 |
| C4 | 1500, 20V |
| C5 | 0.1, 500V |
| C6 | .22 |
| C7 | .22 |
| C8 | .01 |
| C10 | .01 |
| C12 | 68, 16V |
| C13 | .047 |
| C14 | .01 |
| C16 | 3300, 20V |
| C18 | 7700, 6.3V |
| C45 | 1800pf, 500V |
| C46 | 2.2, 25V |
| C56 | 0.2, 500V |
| C57 | .22 |
| C58 | 68, 10V |
| CR1–CR4 | 1N914B |
| CR5 | 1N4934 |
| CR6 | 1N914B |

-continued

| Table of Circuit Component Values (in Ohms, microfarads) | |
|---|---|
| CR7 | 1N4934 |
| CR8 | 1N4002 |
| CR9 | 1N759A |
| CR10-CR11 | MR856 |
| CR13 | MR851 |
| CR14-CR16 | MR851 |
| CR21A-CR21B | MUR1610CT |
| CR22A-CR22B | MBR2535CT |
| CR29 | MR851 |
| CR47-CR50 | IN4007 |
| CR52 | IN4934 |
| CR53 | IN759A |
| CR54 | IN914B |
| CR55-CR56 | MR851 |
| Q1 | 2N 6836 |
| Q2 | 2N 5089 |
| Q3 | MJE 180 SEL |
| Q4 | 2N 5088 |
| Q6 | 2N 5086 |
| U1 | OPI 1264B |
| U2 | OPI 1264A |
| U3 | OPI 1264B |
| U4 | KBL 10 |

What is claimed is:

1. A DC power supply comprising:
   a power transformer having a primary winding and a secondary winding, with said primary winding being coupled to an unregulated DC source and the secondary winding being coupled to a load;
   electrical switching means, operatively coupled in series with said primary winding, which controls the flow of current to said primary winding;
   electrical control means for controlling switching action said switching means, according to the current flowing through the switching means;
   means for sensing said DC source, said sensing means providing a signal proportional to the voltage of said DC source, the sensing means being operatively coupled to the control means to vary the maximum peak current through the switching means, at switching means turnoff, as a function of the voltage of the DC source;
   slew rate limit circuit which limits rise of voltage across said switching means; and
   clamp circuit which prevents the voltage across said switching means from reaching an excessive level.

2. The DC power supply set forth in claim 1 where the DC source sensing means is operatively coupled to the power transformer primary.

3. The DC power supply set forth in claim 1 where the DC source sensing means is a separate winding integrally wound within said power transformer.

4. The DC power supply of claim 3 wherein said control means is a bipolar transistor.

5. The DC power supply of claim 1 wherein said sensing means is a resistor operatively coupled to the primary of the power transformer.

6. The DC power supply of claim 1 wherein said proportional signal is applied to the base of said control means.

7. The DC power supply of claim 1 wherein said transformer is a toroid transformer wherein said sensing means is a separate winding through said transformer.

8. The DC power supply of claim 7 wherein said proportional signal is applied to the base of said control means.

* * * * *

UNITED STATES PATENT AND TRADEMARK OFFICE
CERTIFICATE OF CORRECTION

PATENT NO. : 4,933,829

DATED : June 12, 1990

INVENTOR(S) : White

It is certified that error appears in the above-identified patent and that said Letters Patent is hereby corrected as shown below:

In column 8, line 2; please replace "action said switching" with --action of said switching--.

Signed and Sealed this

Sixteenth Day of July, 1991

*Attest:*

HARRY F. MANBECK, JR.

*Attesting Officer*     *Commissioner of Patents and Trademarks*